United States Patent
Castellanos et al.

(10) Patent No.: US 9,881,255 B1
(45) Date of Patent: Jan. 30, 2018

(54) MODEL BASED SELECTION OF NETWORK RESOURCES FOR WHICH TO ACCELERATE DELIVERY

(71) Applicant: Amazon Technologies, Inc., Seattle, WA (US)

(72) Inventors: Lucia Castellanos, Palo Alto, CA (US); Sai Vishnu Kiran Bhyravajosyula, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 471 days.

(21) Appl. No.: 14/574,227

(22) Filed: Dec. 17, 2014

(51) Int. Cl.
*G06N 99/00* (2010.01)
*G06N 7/00* (2006.01)

(52) U.S. Cl.
CPC ........... *G06N 7/005* (2013.01); *G06N 99/005* (2013.01)

(58) Field of Classification Search
CPC .................................................. G06N 99/005
See application file for complete search history.

(56) References Cited

U.S. PATENT DOCUMENTS

| | | |
|---|---|---|
| 2012/0137201 A1 | 5/2012 | White et al. |
| 2013/0226837 A1* | 8/2013 | Lymberopoulos .... G06F 17/30902 706/12 |

OTHER PUBLICATIONS

A. Foong et al., "Adaptive Web Caching using Logistic Regression", Proc. 1999 IEEE Sig. Proc. Soc. Wkshp., pp. 515-524.*
B. Mobasher et al., "Using Sequential and Non-Sequential Patterns in Predictive Web Usage Mining Tasks", Proc. 2002 IEEE Conf. on Data Mining, pp. 669-672.*
Gery, Mathias, et al., "Evaluation of Web Usage Mining Approaches for User's Next Request Prediction," WIMD '03, ACM, Nov. 2003 (8 pages).

* cited by examiner

*Primary Examiner* — Vincent Gonzales
(74) *Attorney, Agent, or Firm* — Knobbe, Martens, Olson & Bear LLP (57) ABSTRACT

A network resource ("NR") delivery acceleration system predicts web browsing behavior of users based on their frequent navigation habits, the navigation habits of the majority and/or content based prediction. Based on these predictions, the system accelerates the delivery of selected network resources, such as resources on web pages, to user devices in one or more ways, such as by selectively prefetching, caching, preemptively delivering, and/or pre-rendering content items. To determine access probabilities for candidate pages (such as those frequently visited by the user), the NR delivery acceleration system adapts or trains one or more models, such as logistic regression and/or frequency-based models, using individual/personalized browsing histories of users, their content (topic) preferences, and/or aggregated patterns of navigation.

20 Claims, 5 Drawing Sheets

MODEL BASED SELECTION OF NETWORK RESOURCES FOR WHICH TO ACCELERATE DELIVERY

BACKGROUND

When a user navigates from one web page to another, the user typically experiences a noticeable delay as the new page is loaded and rendered. Especially for a mobile device that has a relatively small amount of computing power and low network bandwidth, the delay can be significant. Various acceleration technologies such as local and networked prefetching and caching systems can reduce this delay. For enhanced performance of such systems, determining web pages and other resources that are likely to be requested by the users is a key issue to be addressed.

BRIEF DESCRIPTION OF DRAWINGS

The foregoing aspects and many of the attendant advantages of this disclosure will become more readily appreciated by reference to the following detailed description, when taken in conjunction with the accompanying drawings, wherein.

DETAILED DESCRIPTION

Some embodiments of the present disclosure reduce user-perceived page load times using a logistic regression model. Specifically, a network resource ("NR") acceleration system according to some embodiments adapts a logistic regression model to obtain a coefficient array or a coefficient matrix for calculating, for particular network resources such as web pages, probabilities that a user will access the resource. These probabilities may be based on a variety of factors, such as personalized navigation habits of users, aggregated navigation habits of a population of users, the content of the current page (i.e., the page currently being accessed by the user), the outbound links from the current page, the pages most frequently visited by the user, the degree to which each such frequently visited page is similar in content to the current page, the user's content topic preferences as determined from the user's browsing history, the navigation patterns of other users, and trending data associated with the particular pages.

Based on the calculated probabilities, the NR acceleration system can select one or more network resources from a set of candidate network resources for which to accelerate delivery. An intermediary system that sits logically between user devices and content sites may accelerate delivery (or retrieval from the perspective of end users) of the selected resources in one or more ways, such as by (1) prefetching and caching such resources for subsequent delivery by the intermediary system to one or more user devices, (2) instructing user devices/browsers to prefetch and cache particular resources, (3) preemptively delivering the selected resources to particular user devices/browsers in the background, and/or (4) pre-rendering portions of the resources prior to delivery to the user devices/browsers. User-perceived load times are thereby reduced.

The system can use various behavior prediction models including navigation pattern based prediction models and content (or topic) based prediction models. The prediction models may be user-specific models that use user-specific data, or may be aggregated models that use aggregated data associated with multiple users (e.g., many thousands of users). For navigation pattern based prediction, a set of frequently visited pages can be determined as a set of candidate pages. A logistic regression model may be trained with user specific navigation pattern information to obtain a coefficient vector for estimating access probabilities for each of the frequently visited pages. For content based prediction, topic vectors of a starting page and candidate pages are determined, each topic vector representing one or more topics discussed on the page. One or more techniques may be used to reduce the dimensionality of the topic vectors to thereby reduce the storage and processing burden associated with the vectors.

In some embodiments, a regularized logistic regression model is trained with either a personalized navigation pattern or an aggregated navigation pattern to obtain a coefficient matrix. Using the obtained coefficient matrix, metrics representing probabilities of navigating from the starting page to the candidate pages can be calculated efficiently. Based on the calculated probabilities and metrics, the NR acceleration system can select one or more candidate pages for which to accelerate page loads.

Specific embodiments and example applications of the present disclosure will now be described with reference to the drawings. These embodiments and example applications are intended to illustrate, and not limit, the invention.

Figure 1:
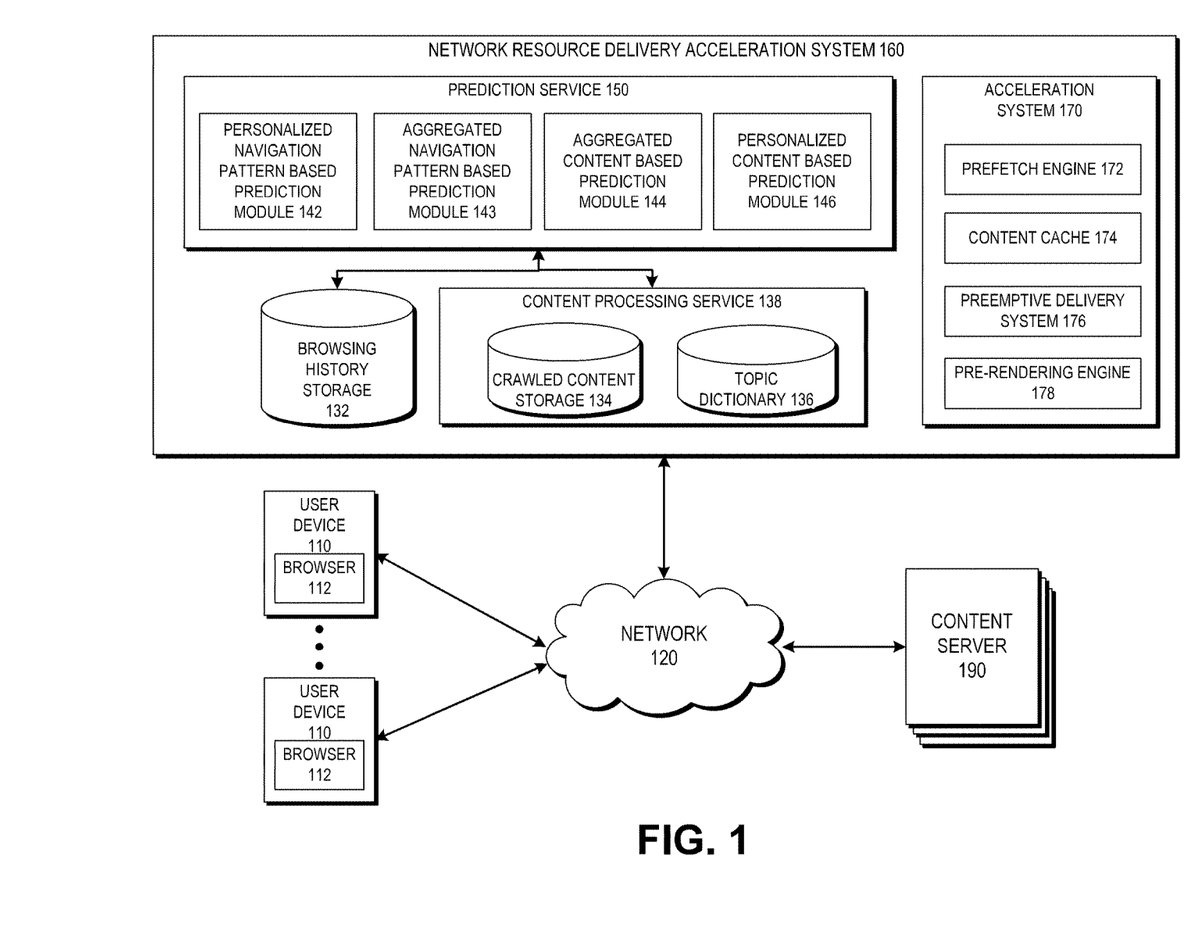
FIG. 1 is a block diagram depicting an illustrative environment for accelerating network resource delivery based on personalized and aggregated navigation habits and based on extracted topics of pages and user preferences.

FIG. 1 is a block diagram depicting an illustrative environment for accelerating page load events based on predictions of user behavior. The environment shown in FIG. 1 includes user devices 110, a network 120, the NR acceleration system 160, and content servers 190. The NR acceleration system 160 may be, or may be part of, an intermediary system that acts as an intermediary between the user devices 110 and the content servers 190. For example, the system 160 may act as a proxy server that requests pages from sites on behalf of user devices. The system 160 may also be capable of pre-rendering pages (or selected portions of the pages), as is known in the art, The user devices 110 can be any of a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 110 may execute a browser application 112 to communicate via the network 120 with other computing systems, such as content servers 190, in order to request and display content pages.

The browsers 112 may, but need not, be specially designed to interoperate with the NR acceleration system 160. In some embodiments, the browsers can retrieve pages directly from the content servers 190, and can also retrieve pages through the NR acceleration system. However, this need not be the case. For example, the browsers may alternatively retrieve all resources directly, or may retrieve all resources through the system 160.

The network 120 may be a publicly accessible network of linked networks, possibly operated by various distinct parties, such as the Internet. The network 120 may include a private network, personal area network, local area network, wide area network, cable network, satellite network, cellular telephone network, etc. or combination thereof, each with access to and/or from the Internet. The user devices 110 communicate with the content servers 190 via the network 120, either directly, via the system 160, or both. The user devices 110 may provide browsing history data and to the system 160 to allow the system to train one more models. The system 160 retrieves content from the content servers 190 predictively and/or in response to requests from particular user devices 110, and transmits the retrieved content to the user devices.

The NR acceleration system 160 includes a prediction service 150 that predicts which resources users will access. In some cases, these predictions may be personalized for particular users based on the browsing histories of such users. For example, the prediction service 150 may, given the URL of the page currently being accessed by the user, calculate, for other particular URLs (and/or other network resources), the likelihoods that the user will navigate from the current page to these respective URLs (or that the user will use some other network resources).

The NR acceleration system 160 also includes an acceleration system 170 that uses the predictions or likelihoods calculated by the prediction service 150 to reduce the page load times perceived by users of the user devices 110. The acceleration system 170 may do this in one or more ways. For example, the acceleration system 170 may include a prefetch engine 172 that predictively prefetches pages and other resources from the content servers 190 based on the predictions. The prefetch engine 172 may additionally or alternatively instruct the browsers 112 running on particular user devices to prefetch such resources. The acceleration system 170 may also include a content cache 174 that caches the prefetched resources and/or resources requested by the user devices; the system 160 may use this cache 174 to service content requests from user devices.

The acceleration system 170 may also include a preemptive delivery service 176 that preemptively/predictively delivers particular resources (such as those pre-fetched by the prefetch engine 172) to particular user devices 110 in the background; the browsers 112 running on such devices 110 may locally cache these preemptively delivered resources. The acceleration system 170 may also include a pre-rendering engine 178 that predictively pre-renders pages, or selected portions of pages, based on the predictions of the prediction service 150. Such pre-rendering offloads rendering tasks from the user devices, and can reduce page load times perceived by users.

User behavior prediction can be implemented using a variety of information including the pattern of routine visits to pages and timing of the visits associated with a particular user (or of a population of users), the content (e.g., text) of web pages or other network resources, the popularity levels of network resources (e.g., trending data), the algorithmically extracted topics of of web pages, user content preferences, the page ranks of network resources, geographical and demographic features, and/or user behavior information. User behavior information may include browsing histories of the users (e.g., visited URLs, visit times, actions performed on the visited pages, etc.). User behavior information may include user specific (device specific) information and aggregated information associated with a plurality of users. Information for predicting user behavior can be stored in one or more data storage systems of the NR acceleration system 160. With reference to FIG. 1, the NR acceleration system 160 includes the browsing history storage 132, the crawled content storage 134, and a topic dictionary 136. The crawled content storage 134 and the topic dictionary 136 are part of a content processing service 138 that analyzes and characterizes the content of specific pages.

The browsing history storage 132 is configured to store and manage user behavior information reflective of the navigation patterns and content preferences of particular users as well as aggregate navigation patterns in terms of frequently visited pages and trending topics. To collect user behavior information (browsing histories) of the users, the NR acceleration system 160 can communicate directly with the user devices 110 or communicate with another computing system operable to collect the user behavior information from the user devices 110. In embodiments in which the browsers 112 may send all content requests through the system 160, the browsing histories may alternatively be maintained based solely on these content requests. The crawled content storage 134 is configured to store and manage content obtained from the content servers 190. The NR acceleration system 160 can use a web crawler to collect content of the content servers 190. Information stored in the crawled content storage 134 may be updated periodically or irregularly based on certain events. Topic dictionary 136 is configured to store and manage a plurality of topics (topic words) that can be used to determine topic vectors of network resources (content).

Based on the available information, the NR acceleration system 160 can predict user behavior by predicting a probability of a particular user device accessing a particular URL (e.g., page). The NR acceleration system 160 can use various approaches to predict the probability of accessing the URL (or other network resources). For example, the system 160 can use a personalized (user specific and/or device specific) navigation pattern based prediction. The personalized navigation pattern based prediction module 142 is operable to determine the probability of accessing the URL (or other network resources) based on the user's previous browsing history. The determined probability of accessing the URL can be the probability that the user will transition directly from the current page to this URL (by selecting a link, typing in the URL, etc.) Alternatively, the probability may be a conditional probability that the user will navigate to the URL from the current URL after visiting one or more intervening URLs; or that the user will require other specific network resources. The user's browsing history can be analyzed based on the user's behavior information stored in the browsing history storage 132. The navigation pattern based prediction module 142 can determine a set of candidate pages for which the probability of accessing by the user (device) will be estimated. The set of candidate URLs may include one or more frequently visited pages of the user, and/or may include pages to which the currently-accessed page has outgoing links. In some embodiments, the set of candidate URLs may include a page that has never been visited by the user. The frequently visited pages of the user can be identified as those pages that the user visited more than a predetermined number of times during a selected period of time. Criteria to identify the frequently visited pages can be determined based on a data analysis to enhance performance of user behavior prediction. In some embodiments, the set of candidate URLs may include a set of relevant URLs. The set of relevant URLs can include out-linked URLs on the currently visited page of the user, URLs having content similar to the user's preferred content, and/or trending (popular) URLs among users. The navigation pattern based prediction module 142 can consider a variety of factors including visit timing information of the currently (and formerly) visited URL (absolute time, average and variation of visit time interval), visit timing information associated with other frequently visited URLs (absolute time, average and variation of visit time interval), popularity of the frequently visited URLs, etc. The navigation pattern based prediction module 142 can use a logistic regression model to estimate the probability of accessing the URL.

In some embodiments, the system 160 can use an aggregated navigation pattern based prediction model. The aggregated navigation pattern based prediction model can be implemented similarly to the personalized navigation based prediction model described above but using aggregated navigation patterns of a population of users rather than the navigation pattern of a specific user. The aggregated navigation pattern based prediction module 143 is operable to determine probabilities that a user will access a candidate page based on aggregated patterns of a plurality of users, as discussed below.

The NR acceleration system 160 can also use content based prediction models. The content based prediction models may include a personalized model that utilizes user specific and/or user-device specific information. In certain embodiments, the NR acceleration system 160 can use an aggregated model that utilizes information associated with a plurality of users. In FIG. 1, the NR acceleration system 160 includes the aggregated content based prediction module 144 and the personalized content based prediction module 146.

To implement content based prediction models, the content processing service 138 of the system 160 may generate content summaries associated with URLs in the form of topic vectors. The topic vector of a URL is a vector that represents the content of the page or other resource retrieved from the URL. To generate a topic vector (content summary) of a specific page, the content processing service 138 extracts text from the page and performs stemming to remove unnecessary information like conjunctions, prepositions, stop words and verb conjugations. Then, content processing service 138 obtains a word representation based on frequency counts of topic words in the topic dictionary 136. The word representation can be understood as a vector of $D_1$ dimensions, where $D_1$ represents the numbers of topic words in the topic dictionary 136. To model content and reduce the dimensionality of the content representation, the content processing service 138 can apply Latent Dirichlet Allocation (LDA) or any other "topic model" algorithm. And to further decrease dimensionality, the content processing service 138 can apply autoencoders (e.g., deep belief networks) to the content representation. The set of all obtained topic vectors of a specific page, together with the topic vector of the corresponding starting page, can be used by the prediction service 150 to estimate a probability of navigating from the starting page to the specific page. In other embodiments, the prediction service 150 may cooperate with a separate computing system that is operable to generate the topic vectors.

The aggregated content based prediction module 144 and the personalized content based prediction module 146 are operable to calculate the probability of accessing a specific candidate page based on the topic vector of the candidate page and the topic vector of the current page. To calculate the probability from the topic vectors, the aggregated content based prediction module 144 and the personalized content based prediction module 146 may use a coefficient matrix that is obtained using a regularized logistic regression model. The regularized logistic regression model can be trained with personalized or aggregated user behavior information stored in the browsing history storage 132. Operation of the aggregated content based prediction module 144 and the personalized content based prediction module 146 will be described in more detail with reference to FIG. 2.

Figure 2:
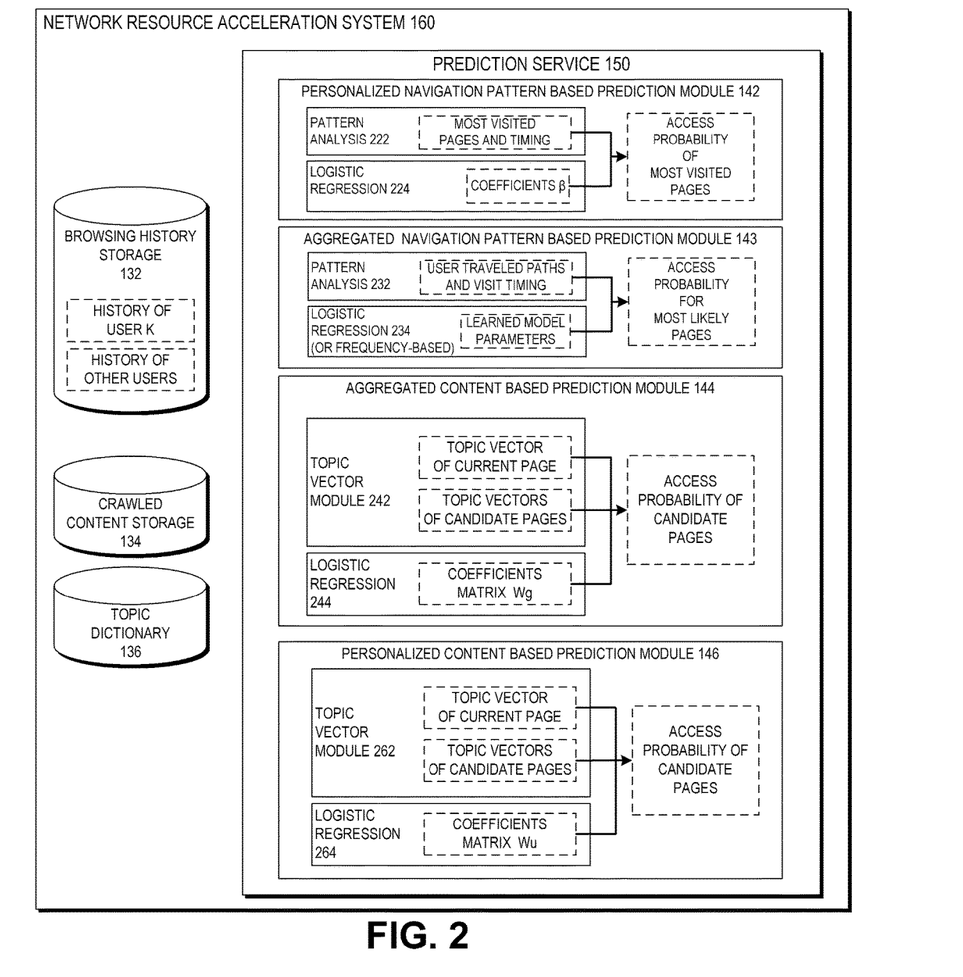
FIG. 2 is a block diagram illustrating components of a network resource acceleration system.

FIG. 2 is a block diagram illustrating components of the NR acceleration system illustrated in FIG. 1.

With reference to the FIG. 2, the personalized navigation pattern based prediction module 142 includes the pattern analysis module 222 and the logistic regression model 224. The pattern analysis module 222 is operable to identify frequently visited pages of a specific user based on the user's browsing history as stored in the browsing history storage 132 and operable to extract features of the visited pages and relative timing. The logistic regression module 224 is operable to learn the coefficients β (coefficient vector) predicting the accessing probability for each of the frequently visited pages of the user. The coefficients β can be obtained by training a regularized logistic regression model with the user's browsing history. Given a set of features from the most frequently visited pages X, the probability of accessing a frequently visited page $X_m$ can be estimated as follows, where T represents the "transpose" vector operation:

$$\hat{P}(\text{access} \mid X_m) = \frac{\exp(X_m^T \hat{\beta})}{1 - \exp(X_m^T \hat{\beta})}$$

The aggregated navigation pattern based prediction module 143 in FIG. 2 includes a pattern analysis module 232 and an optional logistic regression model 234. The aggregated navigation pattern based prediction module 143 is similar in function to the personalized navigation pattern based prediction module 142, but analyzes aggregated navigation patterns of many users. Thus, for example, access probabilities generated by this module 143 are based on the navigation patterns of many users rather than those of a particular user. As shown in parenthesis in FIG. 2, the logistic regression model 234 may be replaced with a frequency based model. In one embodiment, the frequency-based model considers the last n visited URLs.

The aggregated content based prediction module 144 in FIG. 2 includes the topic vector module 242 and the logistic regression module 244. The topic vector module 242 is operable to obtain topic vectors of the current page (the starting page that the user is visiting) and the candidate pages. Identification of the candidate pages is already explained above in connection with the navigation pattern based prediction module 142. The topic vector module 242 calculates the topic vectors for the current page and the candidate pages based, at least in part, on the information stored in the crawled content storage 134 and the topic dictionary 136. The logistic regression module 244 is operable to generate a coefficient matrix $W_g$ that can be used to calculate the access probability for each of the candidate pages. The coefficient matrix $W_g$ can be obtained by training a logistic regression model with the aggregated browsing history (user behavior) associated with a plurality of users that is stored in the browsing history storage 132. Thus, the coefficient matrix $W_g$ encodes the aggregated content based behavior of the users. Given a URL A and a dictionary D, the prediction service 150 generates the topic vector $C_A$ (D) as explained above. For a set of candidate pages to navigate P, the aggregated content based prediction model 144 can calculate a score $s_A(\bullet)$ that represents the probability of navigating to $P_i$ in P as follows, where "∝" means "is proportional to:"

$$s_A(P_i) \propto \exp(C_A^T \cdot W_g \cdot C_{P_i})$$

The personal content based prediction module 146 includes the topic vector module 262 and the logistic regression model 264. The topic vector module 262 is operable to calculate topic vectors of the current page and the candidate pages. The logistic regression module 264 is operable to generate a coefficient matrix $W_u$ for calculating the accessing probability for each of the candidate pages. Operation of the topic vector module 262 and the logistic regression module 264 is analogous to operation of the topic vector module 242 and the logistic regression module 244. The distinction between the aggregated content based prediction module 144 and the personalized content based prediction module 146 is a difference in the training sets for the logistic regression modules 244, 264. Given a URL A and a dictionary D, the content processing service 138 generates the topic vector $C_A$ (D) of the URL A as explained above. For a set of candidate pages to navigate P, the aggregated content based prediction model 144 can calculate a score $s_A(\bullet)$ for each $P_i$ in P as:

$$s_A(P_i) \propto \exp(C_A^T \cdot W_u \cdot C_{P_i})$$

In some embodiments, the system 160 can consider a topic vector that represents user's content preference to calculate the accessing probability for each of the candidate pages. A user preference vector can be calculated based on the user's prosecution history. More specifically, the user preference vector can be generated from contents of frequently visited paged of the user. Operation to generate the user preference vector is analogous to operation of the topic vector modules 242, 262. The personal content based prediction module 146 may calculate scores representing the accessing probabilities of the candidate pages based on the user's content preference, by applying the user preference vector by instead of the topic vector $C_A$ (D) in the calculation described above.

In some embodiments, the system 160 can include a jointly aggregated and personalized content based prediction module which considers both aggregated and personalized navigation patterns. For this jointly aggregated and personalized content based prediction module, the coefficient matrix $W_g$ can be generated as explained above in connection with the aggregated content based prediction module 144. The coefficient matrix $W_u$ that represents personalized content based behavior of the user can be obtained through regularized logistic regression with the following optimization function with a user-specific training set of dimensionality Q, where "s( )" is a score function for a score representing a next-access probability; lambda is a regularized term representing an amount by which the objective function is penalized, and the parallel bars represent an L2-norm vector operation that measures the length of the vector:

$$\frac{1}{Q}\sum_{q=1}^{Q} s(\cdot) + \frac{\lambda}{2}\|W_u - \hat{W}_g\|^2$$

By utilizing regularized logistic regression, the NR acceleration system 160 can calculate the score (metric) representing the probability of accessing a candidate page even when we have limited user specific data. The underlying assumption is that the user's personal preference will be close to the aggregated (global) preferences of other users.

For the content based prediction modules mentioned above, the score calculated for a candidate page using the coefficient matrix can be interpreted as the probability of the user accessing the candidate page. The set of the calculated scores can be processed further to generate a ranked list of the candidate pages. This list may be used to select one or more candidate pages to, e.g., prefetch, pre-render, or preemptively deliver, such that the user-perceived load time will be reduced if the user thereafter accesses that page.

The NR acceleration system 160 may be a single computing device, or it may include multiple distinct computing devices, such as computer servers, logically or physically grouped together to collectively operate as an intermediary system. The components of the NR acceleration system 160 can each be implemented as hardware, such as a server computing device, or as a combination of hardware and software. In addition, the modules and components of the NR acceleration system 160 can be combined on one server computing device or separated individually or into groups on several server computing devices. In some embodiments, the NR acceleration system 160 may include additional or fewer components than illustrated in FIG. 1.

Figure 3A:
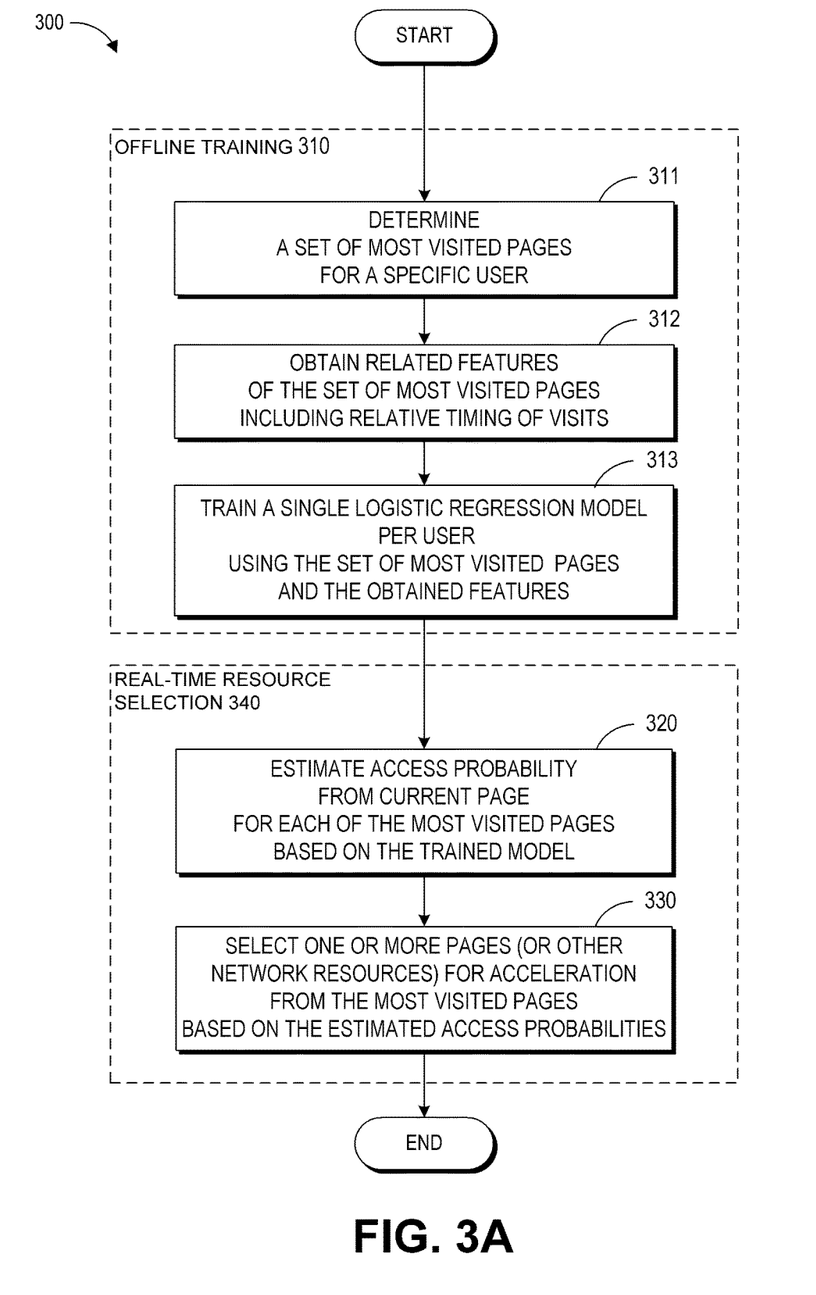
FIG. 3A is a flow diagram illustrating a process of accelerating network resource delivery based on personalized training and "most visited" navigation patterns.

FIG. 3A is a flow diagram illustrating the process of accelerating delivery of pages based on the browsing pattern of a user. Tasks represented by blocks in FIG. 3 can be performed in parallel or in a different order. As illustrated by the dashed box 310 labeled "offline training," blocks 311-313 represent offline tasks that are performed to generate a model based on the behaviors of the user. Dashed box 340 represents real-time tasks 320-330 that are subsequently performed on real time (using the generated model) as the user accesses particular pages.

The personalized navigation pattern based prediction module 142, at block 310, trains a logistic regression model to obtain coefficients for estimating the access probabilities of candidate pages (which are the user's most visited pages in this example). The process of training the logistic regression model (block 310) can be done off-line and/or in batch mode. In other embodiments, the training can also be done 'on-line', that is, immediately updating the learned model with each new observation. At block 311, the personalized navigation pattern based prediction module 142 determines a set of frequently visited pages for the user. The set of frequently visited pages corresponds to the set of URLs visited by the user at least a predefined number of times in a selected time period. The set of frequently visited pages can be analyzed periodically to obtain a set of features for calculating access probabilities for each of the pages in the set.

At block 312, the personalized navigation pattern based prediction module 142 obtains features of the candidate pages (most visited pages). The system 160 analyzes navigation patterns for the candidate pages and obtain features relate to those pages, including visit times.

At block 313, the personalized navigation pattern based prediction module 142 utilizes a single logistic regression model per user to generate coefficients β (coefficient vector). The coefficient β can be obtained by training the single logistic regression model with the entire set of frequently visited pages of the users. When the set of frequently visited pages is updated, the navigation pattern based prediction module 142 will update the coefficient β accordingly.

At block 320, the personalized and aggregated navigation pattern based prediction modules 142 and 143 estimate the access probability for each of the frequently visited pages based on the coefficients from the trained logistic regression model. The system 160 can conduct the process of block 320 in real-time when the user visits the current page. The estimated access probability calculated for a given page may be the probability that the given page will be the next one accessed; alternatively, it may be a probability that the user will access it, given the last n pages she visited (where n can be 2, 3, 4, or 5, for example).

At block 330, the NR acceleration system 160 selects, for acceleration, one or more pages or other resources from the frequently visited pages based on the access probabilities estimated at block 303. The NR acceleration system 160 can use a predetermined probability threshold to make this selection, or can select a predetermined number of highest probability pages and their resources. Acceleration of delivery/retrieval of the one or more selected pages or other resources can be implemented in various ways including pre-rendering, pre-fetching, and/or preemptively delivering such pages, and/or by updating the caching policy associated with these pages. In some embodiments, the type of acceleration action performed for a given page or other resource may depend on its probability of access. For example, pages or other resources for which the probability is relatively high may be pre-rendered, and preemptively delivered to the user device, while lower probability pages may only have their most heavy resources prefetched.

Figure 3B:
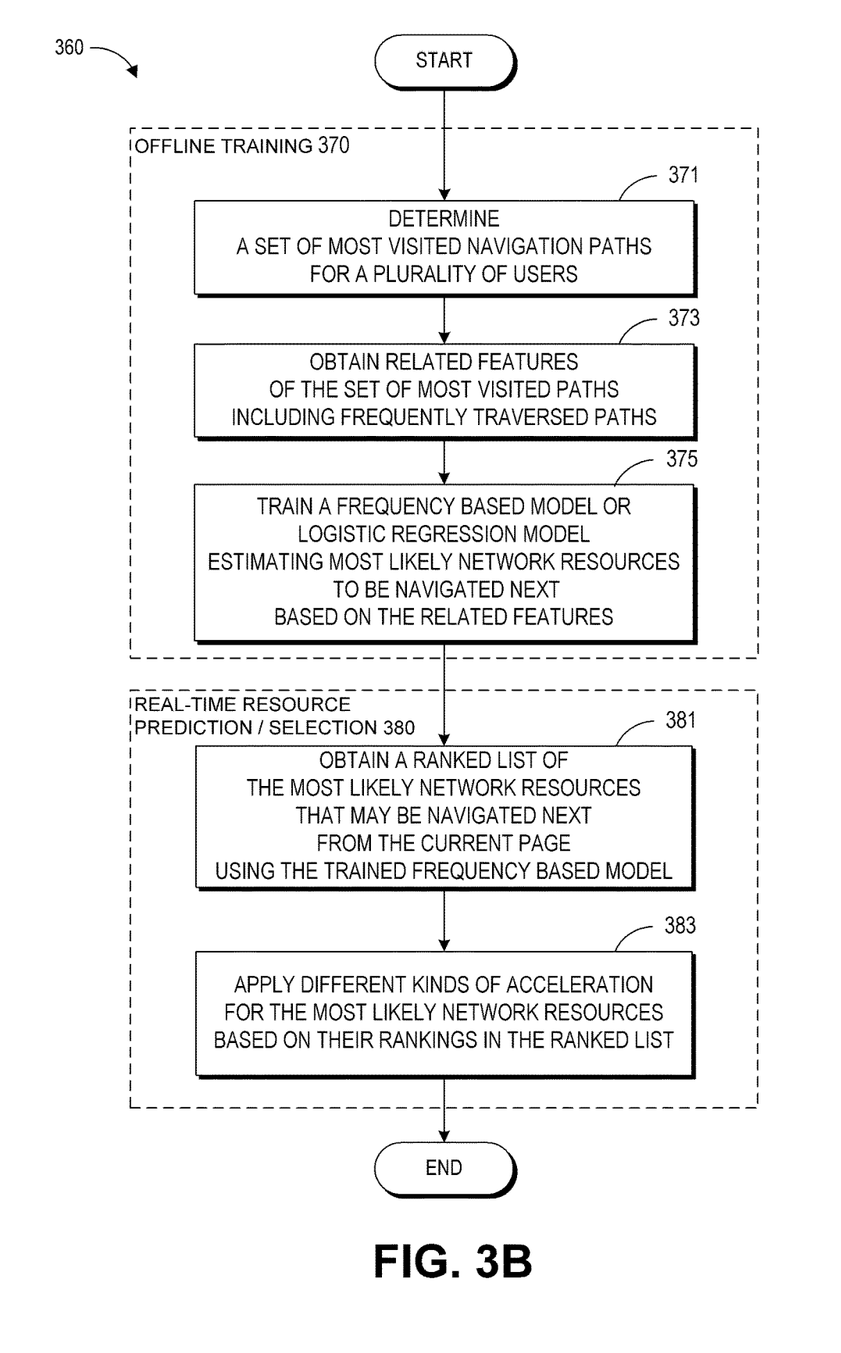
FIG. 3B is a flow diagram illustrating a process of accelerating resource delivery based on aggregated navigation paths of users.

FIG. 3B illustrates a process that uses aggregated navigation paths of many users (typically many thousands) to select network resources for which to accelerate delivery. This process may be used individually or in combination with one or more of the other disclosed process (such as those of FIGS. 3A and 4) to select resources for acceleration. The dashed box 370 identifies the tasks 371-375 that are performed off-line to train a frequency-based model. The dashed box 380 identifies the tasks 381-383 that are performed in real time, and on a user-specific basis, to make navigation predictions using the model and to perform acceleration. B In block 371, the process determines a set of most visited navigation paths by analyzing the stored navigation histories of a population of users. Each navigation path may, for example, be a sequence of URLs accessed during a browsing session. In block 373, the process identifies related features of the most visited paths, including frequently traversed paths. In block 375, the process uses the resulting data to train a frequency-based model. In one embodiment, the frequency-based model considers the user's last n visited URLs for purposes of predicting the next URL to be accessed by the user.

In block 381, which is performed during a user's navigation session (typically with each new page access event), the trained model is used to generate a ranked list of network resources (which may be identified by their URLs) likely to be accessed as the user's next access. The model may generate this ranked list based on the last n pages accessed by the user, where n is a selected integer such as 1, 2, 3, 4 or 5. If n=1, only the current page (that being accessed by the user) is considered. In block 383, acceleration is applied to one or more of the top ranked resources. As mentioned above, different acceleration methods may be applied to different resources based on their respective rankings.

Figure 4:
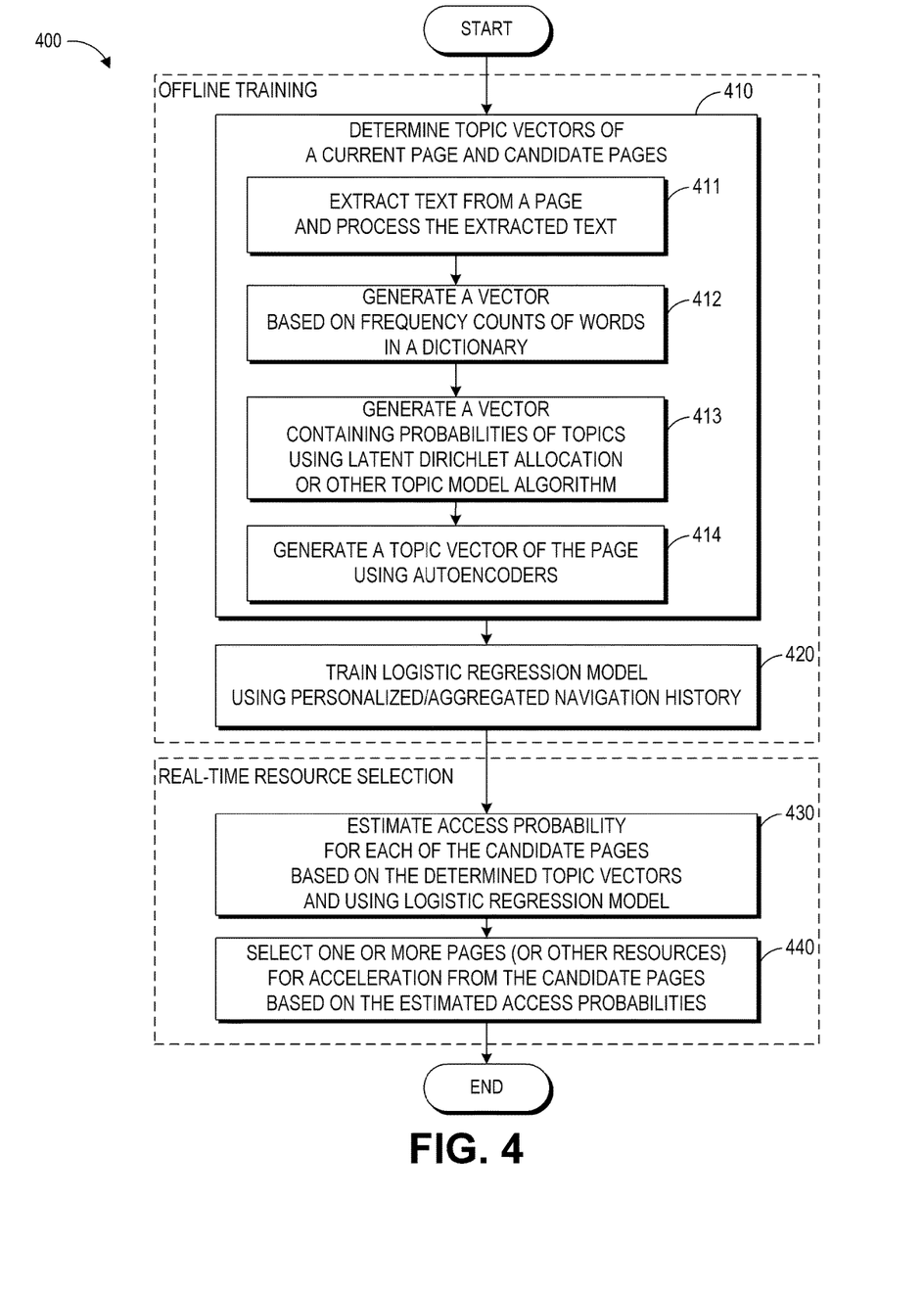
FIG. 4 is a block diagram illustrating a process of accelerating page load events using aggregated and personalized content preferences (topics, etc.).

FIG. 4 is a block diagram illustrating a process for selecting pages to accelerate using a content based prediction model.

At block 410, the topic vector modules 242, 262 determine topic vectors of the current page and the candidate pages. The current page is a page that the user is visiting currently. The candidate pages are pages to which the user may navigate from the current page, such as but not limited to (1) those to which the current page has outbound links, (2) trending pages, and (3) popular news sites or blogs. At block 410, the topic vector modules 242, 262 extract text from the pages and perform stemming on the extracted text to exclude low value information such as conjunctions, stop words and prepositions. At block 412, a first vector can be derived from the processed text based on frequency counts of topic words in the topic dictionary 136. The first vector will have a dimensionality that is same with the numbers of topic words in the topic dictionary 136. At block 413, by applying Latent Dirichlet Allocation (LDA) or other topic model algorithm, a second vector is generated that is smaller in dimensionality than the first vector and contains probabilities of topics. At block 414, the topic vector modules 242, 262 apply autoencoders to further reduce the dimensionality of the second vector, to thereby produce a low dimensional topic vector of the page.

At block 420, the system 160 trains logistic regression models 244, 264 to obtain coefficient matrices for calculating the access probabilities for the candidate pages. The content based prediction modules 144, 146 train their logistic regression models 244, 264 using the personalized navigation pattern (browsing history) of the user or aggregated navigation patterns associated with a plurality of users. The content based prediction modules 144, 146 can obtain their respective coefficient matrices to calculate the probabilities for the candidate pages.

At block 430, based on the topic vectors of the current page, the topic vectors of the candidate pages, and the obtained respective coefficient matrices, the content based prediction modules 144, 146 can estimate probabilities of navigating from the current page to the candidate pages. Once the respective coefficient matrices are obtained, the system 160 can calculate the probabilities substantially in real-time when the user navigates to a new page. In some embodiments, by conducting the process of block 430 iteratively, the system 160 may obtain access probabilities of a candidate navigation path from the current page.

At block 440, based on the estimated probabilities, the NR acceleration system 160 selects a subset of the candidate pages for acceleration. Acceleration of delivery/retrieval of the selected pages may be accomplished using any one or more of the techniques mentioned above. As discussed above, in some embodiments the system may apply different acceleration methods to different pages or to different network resources based on their respective probabilities. The system can also select acceleration techniques for each of the selected pages and for the network resources based on various factors such as size, structure, and content of the pages and navigation statistics associated with the pages (and network resources). In some embodiments, when the system 160 calculates access probabilities of a candidate navigation path that includes multiple candidate pages, different acceleration techniques can be applied for the multiple candidate pages based, for example, on the positions (first, second, third, etc.) of the candidate pages in the candidate navigation path.

Table 1 below summarizes embodiments of the four methods and associated models described above. Any one or more of these four methods may be used individually or in combination to predict the next content page to be accessed by the user, and to select content pages (and/or network resources of such pages) for which to accelerate delivery. The predictions may be in the form of ranked lists of network resources, as described above.

TABLE 1

| | Aggregated | Personalized |
|---|---|---|
| Most-visited (pages or paths) | Paths<br>1) Learning:<br>  a. get the most common paths of navigations among all our users<br>  b. Learn either a frequency based model or a logistic regression model<br>2) During navigation: based on current URL and last n visited URLs, predict next page. | Most-visited pages<br>1. Learning:<br>  a. data mine browsing histories and generate feature vectors for each most-visited page (and each visit)<br>  b. learn logistic regression model per user<br>1) During navigation: based on current URL andtiming and former visits, generate new observation (new feature vectors). Query the logistic regression model, get a score (likelihood) of visiting each of the most visited pages for this user |
| Content based | 1) Learning:<br>  a. Take all transitions from all users particular user (denote A → B)<br>  b. For each A and each B, query the 'content service' and extract the topic vector<br>  c. Learn matrix $W_g$ with logistic regression<br>2) During navigation: if user gets to page C:<br>  a. Query content service to get topic vector from page C<br>  b. Query content service to get topic vector from all candidate pages<br>  c. By plugging in these topic vectors into the model (that uses the $W_g$), get a score for each transition C→ eachCandidatePage. These scores represent how likely eachCandidatePage will be navigated-to next. | 1) Learning:<br>  a. Take all transitions from all users particular user (denote A → B)<br>  b. For each A and each B, query the 'content service' and extract the topic vector<br>  c. Learn matrix $W_u$ with logistic regression<br>  Alternatively: learn content based aggregated model FIRST, and use $W_g$ to 'guide the learning' of $W_u$- this helps because we might not have enough data<br>2) During navigation: if user gets to page C:<br>  a. Query content service to get topic vector from page C<br>  b. Query content service to get topic vector from all candidate pages<br>  c. By plugging in these topic vectors into the model (that uses the $W_g$), get a score for each transition C→ eachCandidatePage. These scores represent how likely eachCandidatePage will be navigated-to next. |

The "candidate" pages mentioned in the table, may, for example, include (1) the user's most visited pages, (2) trending pages, (3) pages to which the current page has an outgoing link, and/or (4) pages selected using another method.

In one embodiment, all four methods of Table 1 are used in combination, as follows, to select network resources for which to accelerate delivery: (1) if there is a reliable prediction from the "most-visited, personalized" method, it is used; if not: (2) if there is a reliable prediction from the "content based, personalized" method, it is used; if not: (3) if there is a reliable prediction from the "most-visited paths, aggregated" method, it is used, if not: (4) if there is a reliable prediction from "content based, aggregated," it is used. In another embodiment, the same decision logic is used but with (3) and (4) interchanged.

It will be appreciated by those skilled in the art that all of the functions described in this disclosure may be embodied in software (programs) executed by one or more physical processors of the disclosed system 160. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored assume in a computer-readable medium and loaded into memory of the computing device using a drive mechanism associated with a computer readable storage medium storing the computer executable components such as a CD ROM, DVD ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer implemented method of selecting network resources for which to accelerate delivery to a user device, the method comprising:
as implemented by one or more computing devices configured with specific computer-executable instructions,
identifying a set of frequently visited content pages for a particular user based on a browsing history of the user;
generating feature vectors for the set of frequently visited content pages;
training a predictive model based on the feature vectors to generate a most-visited based predictive model;
during navigation by the user, for particular ones of the frequently visited content pages, and based on the most-visited based predictive model, generating a first score, representing a probability that the user will access the respective content page;
identifying transitions between content pages based on browsing history data of one or more users;
generating topic vectors for particular content pages based on the identified transitions;
generating a content-based model by training a logistic regression model using the identified transitions and topic vectors;
during navigation by the user, using the content-based model to generate, for each of a plurality of candidate content pages, a second score representing a probability of the user navigating from the current content page to the respective candidate content page; and
selecting, based on at least the first score and the second score, at least one content page or other network resource for which to accelerate delivery to a user device of the user.

2. The computer implemented method of claim 1, wherein the content-based model is a personalized content-based model based on transitions of the particular user.

3. The computer implemented method of claim 1, wherein the content-based model is a non-personalized content-based model based on transitions of a plurality of users.

4. The computer implemented method of claim 1, further comprising accelerating delivery of a selected network resource at least partly by pre-fetching the selected network resource.

5. A system, comprising:
a computing system comprising one or more computing devices, the computing system configured with executable program instructions to at least:
obtain a browsing history of a user;
identify a set of frequently visited network resources based on the browsing history of the user;
train a logistic regression model with the set of frequently visited network resources, wherein training the logistic regression model comprises generating a first set of coefficients;
based on the first set of coefficients, calculate probabilities of the user accessing each of the candidate network resources; and
select, based on the calculated probabilities, at least one frequently visited network resource for which to accelerate delivery to a user device associated with the user;
wherein the computing system is additionally configured to:
generate topic vectors of a current page and a set of candidate pages, the current page being a page currently accessed by the user;
train a second logistic regression model with previous navigation patterns from the current page to other pages, wherein training the second logistic regression model comprises generating a second set of coefficients;
calculate scores based at least partly on the topic vectors and the second set of coefficients;
select, based on the calculated scores, at least one candidate page or other network resource for which to accelerate delivery to a user device associated with the user.

6. The system of claim 5, wherein the previous navigation patterns for training the second logistic regression model consist of previous navigation patterns of the user.

7. The system of claim 5, wherein the previous navigation patterns for training the second logistic regression model include previous navigation patterns of other users from the current network resource.

8. The system of claim 5, wherein the computing system is additionally configured to:
generate a third set of coefficients using a third regularized logistic regression model and using the second set of coefficients, wherein the scores are based additionally on the third set of coefficients.

9. The system of claim 5, wherein the computing system is additionally configured to accelerate delivery of the selected network resource at least partly by pre-fetching the selected network resource.

10. The system of claim 5, wherein the computing system is additionally configured to generate a logistic regression model with personalization browsing patterns to provide personalized recommendations of network resources.

11. A non-transitory computer storage medium storing computer-executable instructions that direct a computing system to perform operations comprising:
obtaining a browsing history of a user;
identifying a set of frequently visited network resources based on the browsing history of the user;
training a logistic regression model with the set of frequently visited network resources, wherein training the logistic regression model comprises generating a first set of coefficients;

based on the first set of coefficients, calculating probabilities of the user accessing each of the candidate network resources;

selecting, based on the calculated probabilities, at least one of the set of frequently visited network resources for which to accelerate content delivery to a user device associated with the user;

generating topic vectors of a current network resource and a set of candidate network resources, the current network resource being a network resource currently accessed by the user;

training a second logistic regression model with previous navigation patterns from the current network resource to other network resources, wherein training the second logistic regression model comprises generating a second set of coefficients; and calculating scores based at least partly on the topic vectors and the second coefficient matrix.

12. The non-transitory computer storage medium of claim 11, wherein the previous navigation patterns for training the second logistic regression model consist of previous navigation patterns of the user.

13. The non-transitory computer storage medium of claim 11, wherein the previous navigation patterns for training the second logistic regression model include previous navigation patterns of other users from the current network resource.

14. The non-transitory computer storage medium of claim 11, wherein the operations further comprise:

generating a third coefficient matrix using a third regularized logistic regression model and using the second coefficient matrix, wherein the scores are based additionally on the third coefficient matrix.

15. The non-transitory computer storage medium of claim 11, wherein the operations further comprise:

accelerating delivery of the selected network resource at least partly by pre-fetching the selected network resource.

16. A computing system comprising one or more computing devices, the computing system programmed with executable program instructions to implement at least:

a first predictive model trained with data representing a navigation history of a user, the first predictive model configured to generate scores representing likelihoods that the user will access particular content pages, of a set of frequently visited content pages of the user, based on a current page accessed by the user;

a second predictive model trained with (1) topic vectors for particular content pages and (2) transitions between content pages, said transitions identified from navigation history data of one or more users, the second predictive model configured to generate scores representing likelihoods of navigating from a current content page to particular candidate content pages based at least partly on topics represented on the current and candidate content pages; and an acceleration system configured to use the scores generated by the first and second predictive models to select content pages or other network resources for which to accelerate delivery to a user device of the user.

17. The computing system of claim 16, wherein the second predictive model is a personalized model based on a navigation history of said user.

18. The computing system of claim 17, further comprising a third predictive model trained with navigation histories of a plurality of users, wherein the acceleration system is configured to additionally use scores generated by the third predictive model to select content pages or other network resources for which to accelerate delivery.

19. The computing system of claim 16, wherein the second predictive model is a non-personalized model based on navigation histories of a plurality of users.

20. The computing system of claim 16, wherein at least the first predictive model is a logistic.

* * * * *